United States Patent [19]

Kupcikevicius

[11] Patent Number: 5,027,863
[45] Date of Patent: Jul. 2, 1991

[54] ARTICLE FOR USE IN MAKING STUFFED CASING PRODUCTS HAVING AT LEAST ONE FLAT END

[75] Inventor: Vytautas Kupcikevicius, Oaklawn, Ill.

[73] Assignee: Viskase Corporation, Chicago, Ill.

[21] Appl. No.: 381,238

[22] Filed: Jul. 18, 1989

[51] Int. Cl.⁵ .................. F16L 11/00; A22C 11/02
[52] U.S. Cl. .................. 138/118.1; 428/34.8
[58] Field of Search ........... 138/103, 110, 118, 118.1, 138/178; 17/1 R, 33, 35, 41, 49; 426/105, 135, 138; 428/34.8

[56] References Cited

U.S. PATENT DOCUMENTS

| | | |
|---|---|---|
| 2,751,306 | 6/1956 | Snyder . |
| 2,912,924 | 11/1959 | Roberts et al. . |
| 3,462,793 | 8/1969 | Sumption . |
| 3,808,638 | 5/1974 | Kupcikevicius et al. . |
| 4,466,463 | 8/1984 | Kupcikevicius ............ 138/118.1 |
| 4,466,464 | 8/1984 | Kupcikevicius et al. ....... 138/118.1 |
| 4,466,465 | 8/1984 | Frey . |
| 4,466,466 | 8/1984 | Randys ............... 138/118.1 |
| 4,466,984 | 8/1984 | Kupcikevicius . |
| 4,525,895 | 7/1985 | Randys ............... 138/118.1 |
| 4,562,617 | 1/1986 | Kollross . |
| 4,641,687 | 2/1987 | Kupcikevicius .......... 17/1 R |

Primary Examiner—James E. Bryant, III.
Attorney, Agent, or Firm—Roger Aceto

[57] ABSTRACT

An article and method for use in making stuffed food products with at least one flat end has a plurality of annular discs connected one to another by a long tubular membrane which passes through the central opening in each disc. The membrane is transversely circumferentially perforated between each disc and stuffing pressures cause the tubular membrane to longitudinally extend and tear at the preforations so that discs can be longitudinally separated and introduced one at a time into the stuffed food product for flattening an end of the product.

12 Claims, 4 Drawing Sheets

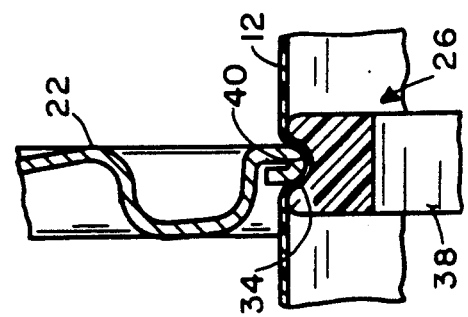
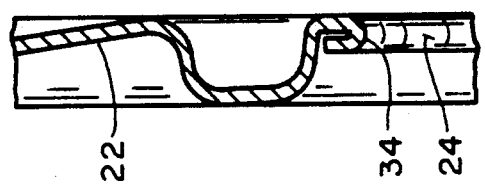
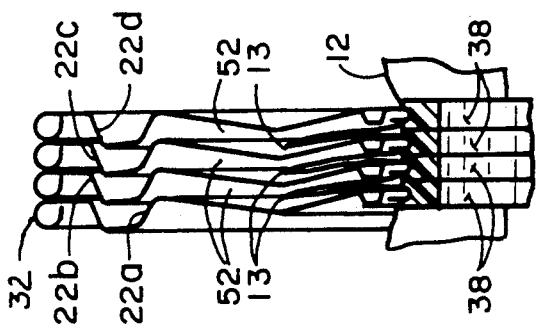
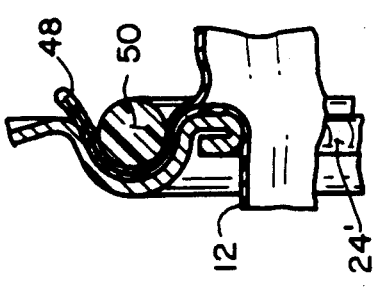
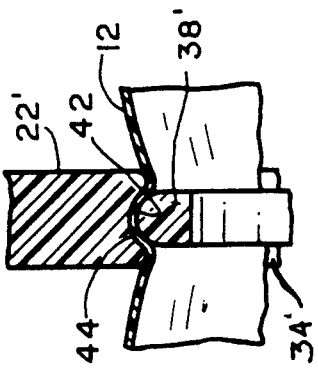
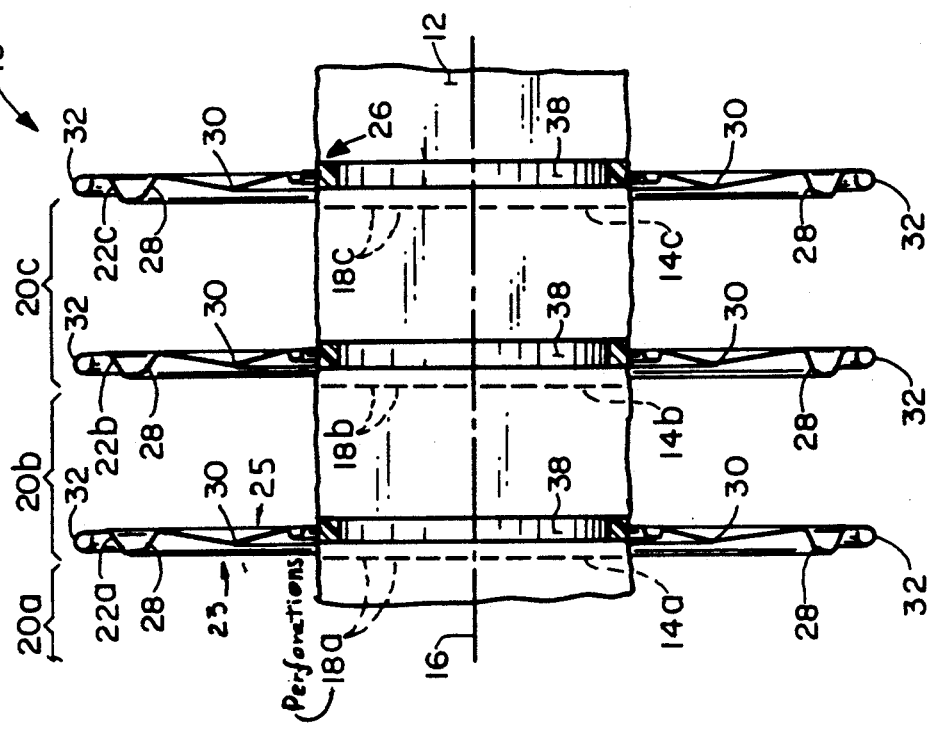

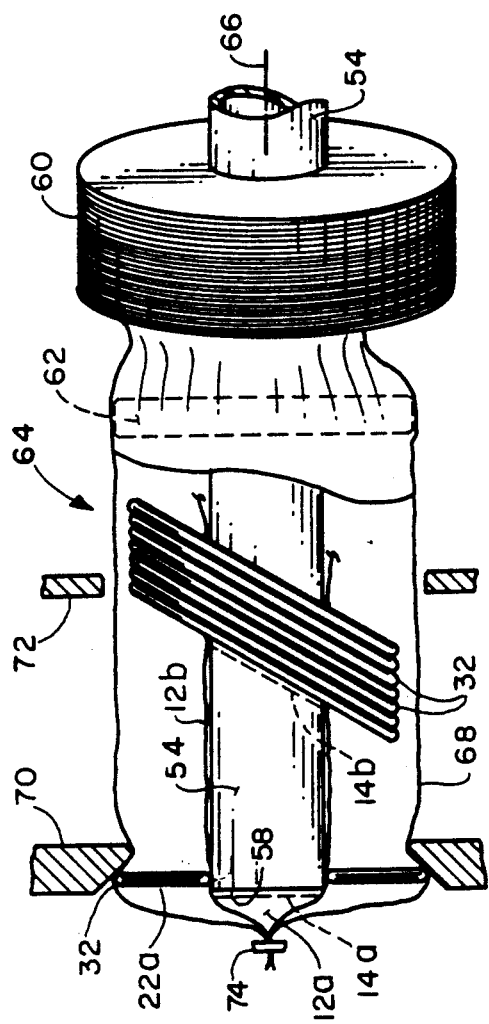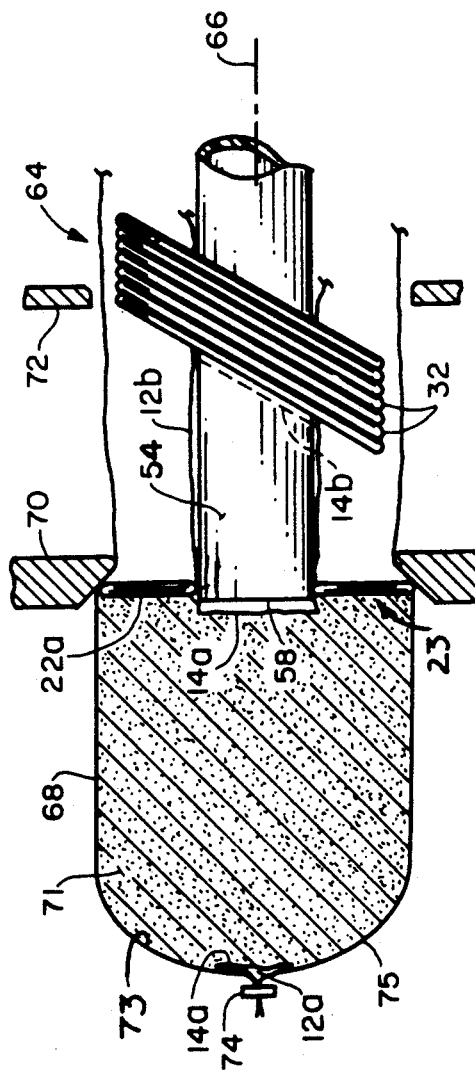
FIG. 7
FIG. 8

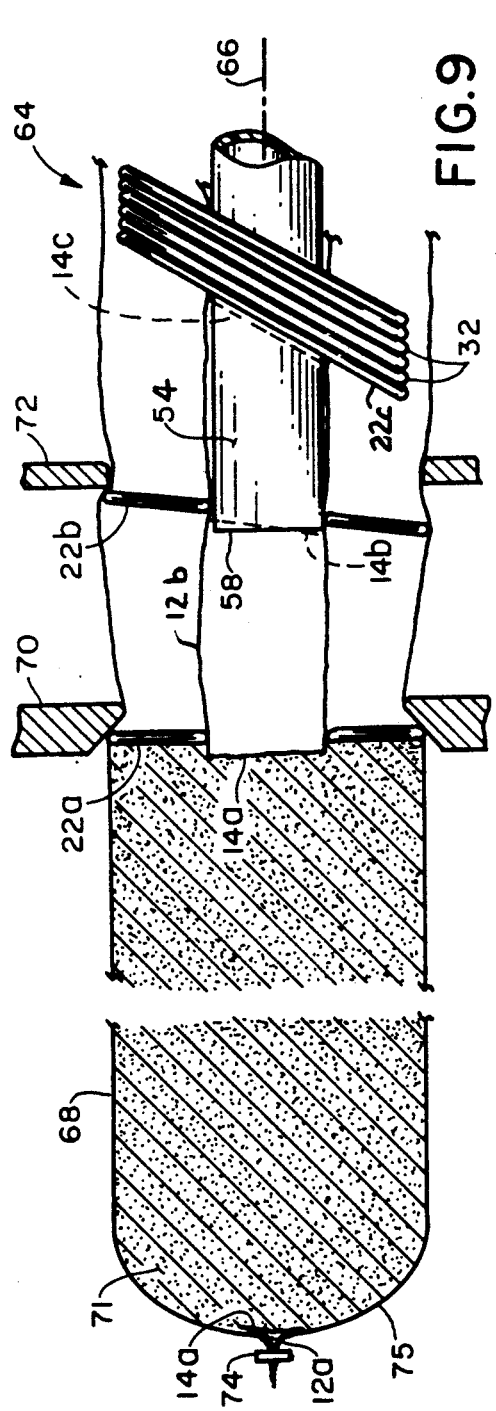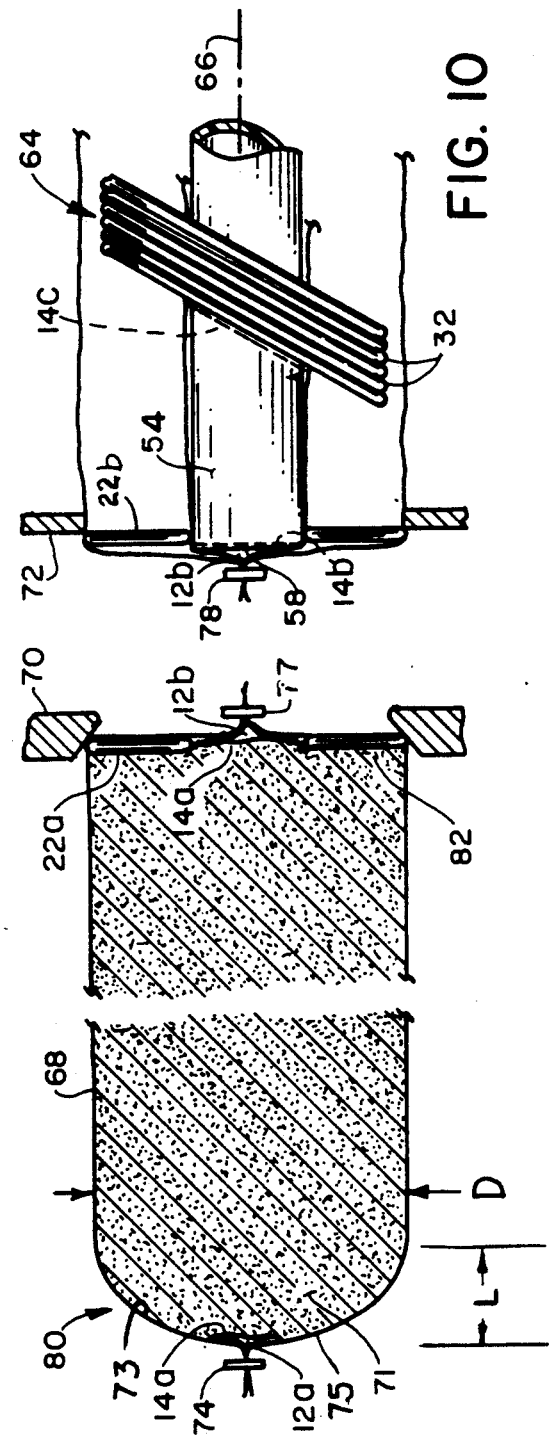

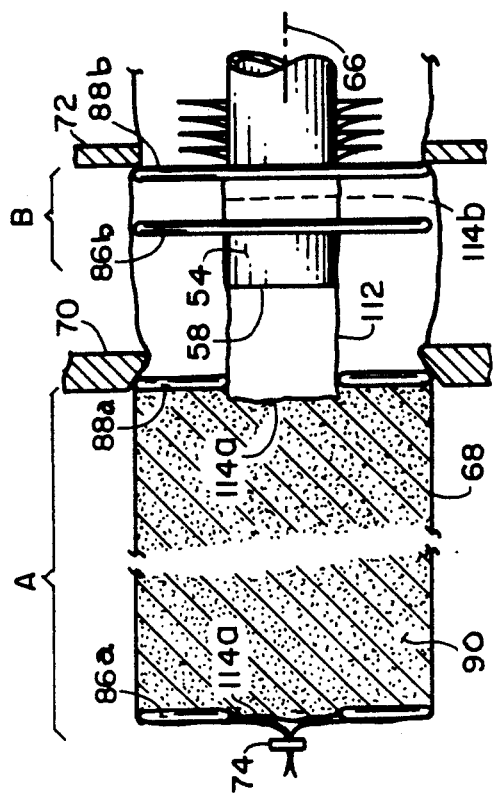
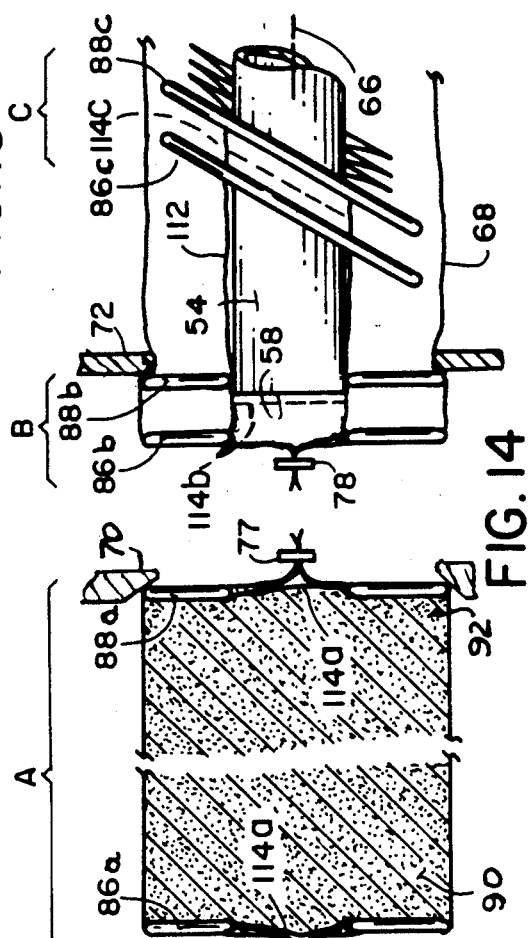
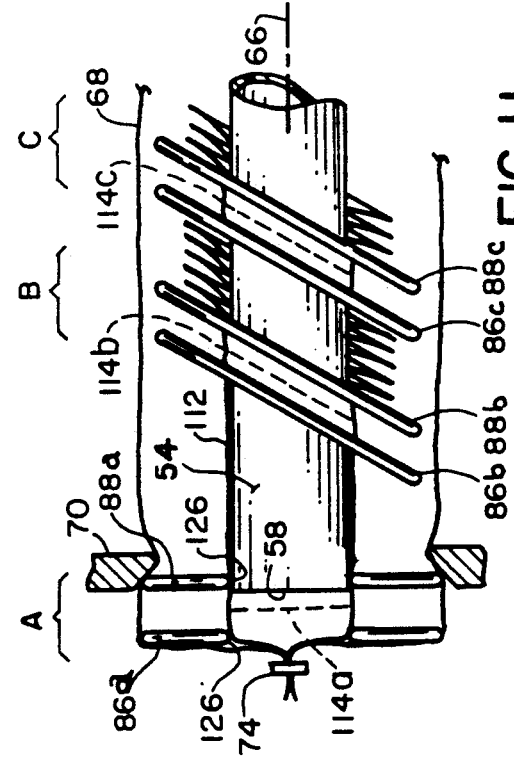
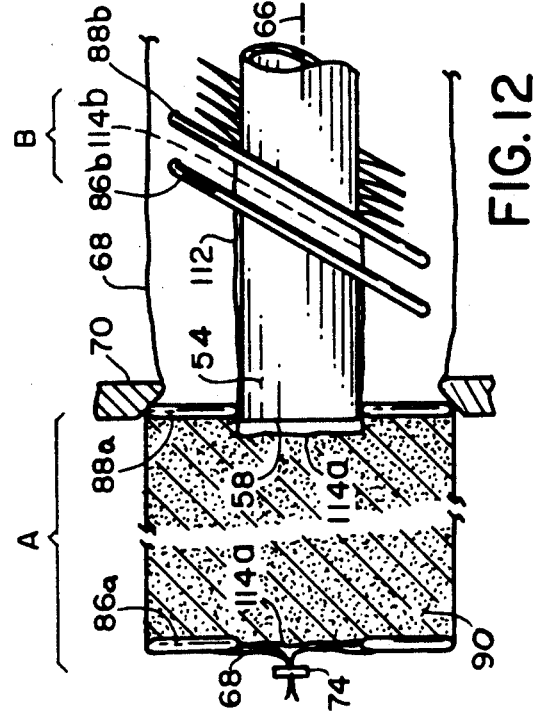

ARTICLE FOR USE IN MAKING STUFFED CASING PRODUCTS HAVING AT LEAST ONE FLAT END

FIELD OF THE INVENTION

The invention relates generally to an article and method for use in the stuffing of food products into food casings to produce a stuffed product such as bologna and the like having at least one flat end. More particularly, the invention relates to an article composed of a plurality of discs which are fed one at a time into a casing as the casing is being stuffed to flatten an end of the stuffed casing product.

A stuffed casing product having at least one flat end is desirable in cases where the product is intended to be sliced and packaged for retail sales. Typically, products of this type are stuffed into a casing to a controlled diameter and then are cooked or cured according to conventional processes. Thereafter, they are sliced on an automatic slicing machine and packaged into units of predetermined weight and slice count for retail sale. the slicing devices employed in such packaging operation are preset to yield a specific weight-by-slice count for use in obtaining unit packages of equal weight.

In order to produce uniform slices for as much of the full length of the stuffed casing product as possible, it is desirable that the closed leading and/or trailing end of the stuffed product be substantially flat because rounded ends are not suited to be used for producing uniform slices for the equal weight packages sold at retail. Consequently, the round ends are sliced off and reprocessed.

In order to minimize the rework resulting from rounded ends, attempts have been made to flatten them by inserting flat discs into one or both ends of the casing. For example, U.S. Pat. No. 3,808,638 discloses inserting a disc into one end of a cut-length of casing to produce a single stuffed product having one flat and one rounded end.

U.S. Pat. No. 4,466,465 discloses a casing article for use in making stuffed products with flat ends. The article includes a shirred casing having an unshirred portion and annular discs disposed in the unshirred portion. Each disc has a central opening and the casing article is positioned on a stuffing horn with the horn extending through each disc opening. During stuffing, the discs are moved off the horn and into the stuffed casing to flatten the ends of the stuffed product. As disclosed in the '465 Patent, the annular discs are arranged in pairs. The discs of each pair are snapped together so they separate responsive to the introduction of a food product between them such that one of the separated discs forms the flat leading end of the product and the other disc forms the flat trailing end of the product. In addition, the pairs of discs can be joined together by short lengths of a flexible tubular membrane to form a long chain array. Discs from the array are sequentially introducted over a stuffing horn and into a casing during the stuffing operation to permit the continuous and automatic production of a plurality of flat ended stuffed casing products from a single continuous shirred length of casing.

The system as described in the '465 Patent permits the automatic and continuous production of stuffed products having two flat ends. However, it was found that the discs in each pair did not always separate because due to manufacturing tolerances, the tightness of the snap fit between discs was not consistent. Consequently, apparatus modifications, as disclosed for example, in U.S. Pat. No. 4,621,392, were required in order to insure the separation of one disc from another.

As further disclosed in the '465 Patent and in U.S. Pat. No. 4,466,984, the assembly of an array of paired discs as required for continuous production of stuffed products requires at least two assembly steps. First a module is made comprising a short length of flexible tubular membrane having a male disc connected at one end and a female disc at the other. Then modules are connected together by means of the snap-fit connection of the male disc of one module to the female disc of another module. This two step assembly added to the cost of the system.

Moreover, it was not always possible to obtain the projected rework savings when automatically slicing a stuffed product having two flat ends. This is due to limitations of the automatic slicing apparatus which are designed primarily to accommodate stuffed products having rounded ends. Consequently, in some cases, a stuffed product having one rounded end and one flat end can produce a greater rework savings than one having two flat ends.

The article of the present invention provides an arrangement which, in one embodiment, is useful for producing stuffed casing products having one flat end and, in a second embodiment, is useful for producing stuffed products having two flat ends. It also simplifies construction and therefore cost by eliminating the need for male/female discs which snap fit together. This is done by providing for the connection of all of the discs to a single continuous relatively long length of the tubular membrane.

SUMMARY OF THE INVENTION

Accordingly, an article for use in flattening an end of a stuffed casing product according to the present invention is characterized by:

a) an elongated tubular flexible membrane having at spaced intervals along its length, discrete transverse frangible areas dividing said elongated tubular flexible membrane into shorter sections which are separable one from another upon tensioning across said frangible areas;

b) a plurality of flat discs of a size sufficient for insertion into a food casing for flattening an end of a stuffed product to be made with a said food casing, each said disc having a central opening therethrough bounded by an inner wall;

c) said membrane extending through the central opening in each disc and said discs being oriented normal to the longitudinal axis of said flexible tubular membrane and spaced along said tubular membrane such that at least one of said discs is associated with each of said shorter sections; and d) means at each of the spaced locations for securing the outer surface of said tubular membrane and a said disc to each other.

DESCRIPTION OF THE DRAWINGS

FIG. 1 is an elevational cross sectional view of a portion of the article of the present invention in a longitudinally expanded condition;

FIG. 2 is an elevational cross sectional view on an enlarged scale showing the article in an axially collapsed condition to shorten its length;

FIG. 3 is a view on a greatly enlarged scale showing the inner edge of a disc in cross section;

FIGS. 4-6 are views similar to FIG. 3 showing alternate embodiments for connecting each disc to the tubular membrane;

FIGS. 7-10 illustrate steps in the stuffing method of the present invention using the article of FIG. 1 to produce a stuffed product, as shown in FIG. 10, having one flat end; and FIGS. 11-14 are views similar to FIGS. 7-10 showing an embodiment of the article and method of the present invention for use in making a stuffed product with two flat ends.

DETAILED DESCRIPTION

Referring to the drawings, FIG. 1 shows an embodiment of the article of the present invention for use in flattening one end of the stuffed casing product as further discussed herein below.

The article, a portion of which is generally indicated at 10, includes a flexible tubular membrane 12 preferably made from a thin plastic such as a polyethylene film. The tubular membrane 12 may be upwards of six meters or more in length with an inside diameter large enough to fit easily over a stuffing horn used for a given stuffing operation.

The tubular membrane has discrete frangible areas 14a, b, c, etc. at spaced intervals along its length which extend substantially transverse the longitudinal axis 16 of the tubular membrane. Each frangible area is formed by a plurality of perforations 18 in the membrane which extend about its circumference. Preferably the perforations 18 are aligned in a straight line oriented normal to longitudinal axis 16. These frangible areas allow separation of the long tubular membrane 12 into short sections 20a, b, c, etc. of substantially equal length by longitudinal tensioning across the frangible areas.

Disposed at spaced locations along the tubular membrane are a plurality of annular discs 22. The term disc or flattening disc as used herein designates a substantially flat circular member which is insertable into a food casing with its flat surfaces 23, 25 oriented normal to the longitudinal axis of the casing to flatten or at least partly flatten the end of a stuffed product made with the casing. The discs preferably are used in the production of relatively large diameter (50 mm to 180 mm) stuffed products of the type which, after processing, are sliced and sold in package form at retail. The function of the disc is to flatten or at least partly flatten one or both ends of such a product from the conventional rounded configuration thereby reducing the need to reprocess the portion of the product otherwise contained in a rounded end.

As best seen in FIG. 3, each disc has a central opening 24 to accommodate the passage of the tubular membrane. Each disc 22 is secured to the membrane 12 by any suitable means generally indicated at 26 (FIG. 1) described further hereinbelow.

In the embodiment of the invention as shown in FIG. 1, there is only one disc 22 associated with each of the shorter membrane sections 20. Preferably, in this embodiment, each disc 22 is located as close as possible to the frangible area 14 which leads it in the direction of stuffing (to the left as viewed in the figures). Thus, discs 22a, b, c, etc. are located just behind (to the right of) frangible areas 14a, b, c, etc.

The flattening discs useful in the present invention can be made of a wide variety of materials, provided that the surface of the material chosen (or a coating on the surface of the material) meets the required government specification for use with food products. Useful materials include metals such as aluminum and steel, and plastics such as polystyrene and polypropylene. It is preferred that the discs each be of sufficient strength to resist deformation to a rounded configuration due to the internal pressure in the stuffed product. A preferred annular disc is constructed from tin-plated steel having a thickness of about 0.0085 inch with a food approved surface coating, and having annular ribs 28 and a dish shape as shown at 30 (as often found in can lids) for added stiffness.

Also, the outer periphery of the disc is provided with a rim 32 which is formed by rolling to a rounded profile. This rim stiffens the disc and provides a smooth outer contour which avoids damaging the food casing that contacts the rim during stuffing and processing.

As shown in the enlarged drawing of FIG. 3, the central opening 24 of each disc 22 is bounded by a disc inner wall surface 34. The tubular membrane 12 passes through disc opening 24 in contact with the inner wall surface 34 so that the disc may be secured to the tubular membrane as shown in FIGS. 4-6.

FIG. 4 shows a preferred securing means 26 to comprise an annular retainer 38 having a groove 40 formed in its outer periphery. The retainer is relatively rigid yet is radially compressible so it can be held in a contracted state for insertion into disc opening 24. After insertion, the retainer is allowed to snap back to its original size which seats its peripheral groove 40 against the disc inner wall surface 34. This in turn, captures the tubular membrane 12 between the retainer 38 and the wall surface 34 to secure the disc 22 to the membrane.

A preferred retainer material is polycarbonate. This material can be formed as an unbroken ring having the resiliency required to snap-fit into the disc opening 24. For example, a polycarbonate retainer about 2.54 mm thick having an outside diameter of about 46.07 mm provided with a peripheral groove 0.635 mm deep and having an inside diameter of 40.89 mm, can undergo a 5% radial contraction for snap-fit into a disc opening about 44.95 mm in diameter.

One alternative arrangement for securing the membrane to each disc is shown in FIG. 5. In this embodiment, the disc 22' is thick enough so the disc inner wall surface 34' can be provided with a groove 42. The retainer 38' in turn is provided at its outer periphery 44 with a configuration that seats into the disc groove 42 to secure the disc to the tubular membrane 12.

Another alternative securing means is illustrated in FIG. 6 A and B. In this embodiment one flat surface of the disc has a formed channel 46 that extends around the disc opening 24'. The tubular membrane 12 is folded and a portion 48 is draped into the channel 46 as shown in FIG. 6A. Thereafter an O-ring 50 or the like is pressed and snap-fit into the channel to capture the draped portion of the tubular membrane (FIG. 6B) and this secures the disc to the outer surface of the tubular membrane.

The number of discs 22 and the length of the tubular membrane 12 depends upon the number of stuffed pieces to be made in one continuous operation. For example, if the shirred casing used in the stuffing operation is long enough to produce 50 stuffed pieces, then the article 10 as shown in FIG. 1 should contain at least 50 of the discs for flattening one end of each stuffed piece. If about 127 mm of flexible tubular membrane is allowed between each disc (and at each end) this means that the membrane in this case would be about 6.35 meters long.

This article comprising the relatively long length of tubular membrane 12 and its attached array of discs 22 can be longitudinally collapsed to nest the discs one against the other as shown in FIG. 2. This greatly reduces the overall length of the array to facilitate its use in a stuffing operation. When the article is collapsed in this fashion, the tubular membrane 12 is simply gathered and folded as shown at 13 into the spaces 52 between adjacent discs 22a, b, c etc. It is preferred that the flexible tubular membrane occupy a minimum of longitudinal space when fully collapsed in order to minimize the over length of the collapsed article. Accordingly, the membrane should be relatively thin (on the order of 0.038 mm to 0.127 mm), yet strong enough to withstand the pressures encountered during the stuffing operation.

U.S. Pat. Nos. 4,466,984 and 4,551,884 are incorporated herein by reference for a detailed description of the operation of a stuffing apparatus for making stuffed products having flat ends. For purposes of the present invention, only so much of the stuffing apparatus will be described herein to permit an understanding as to how the present invention is used in cooperation with stuffing apparatus to produce a stuffed casing product having at least one flat end on a continuous and automatic basis.

FIG. 7 shows a portion of a stuffing apparatus including a stuffing tube 54 having a discharge end 58.

The stuffing tube carries a shirred casing supply a portion of which is shown at 60. Just forward (in the stuffing direction) of the shirred casing is a sizing disc 62. The sizing disc has an outer circumference greater than the unstretched circumference of the casing so that the casing is stretched circumferentially as it deshirs and passes over the sizing disc. The length of the stuffing tube from the sizing disc to the discharge end 58 is utilized to accommodate an array of end flattening discs generally indicated at 64. In this respect the discs, nested one against the other, are loaded onto the stuffing tube 54 by passing the stuffing tube through the tubular membrane 12. Preferably the discs of the array 64 are tilted with respect to the longitudinal axis 66 of the stuffing tube when they are loaded onto the tube. This tilted orientation allows a deshirred portion 68 of the casing to clear the rim 32 of the discs in the array so there is no interference to the passage of the casing from the sizing disc 62 to the stuffing tube discharge end 58. Preferably, the disc array 64 is overwrapped or contained in a housing (not shown) which maintains them in this tilted orientation. Such an overwrap and housing are disclosed in U.S. Pat. No. 4,466,984.

Also disclosed in FIG. 7 are an emulsion seal split ring 70 and a disc positioning ring 72. These and other stuffing apparatus components required to utilize the discs in the stuffing of flat ended sausage products are described in more detail in the aforesaid U.S. Pat. Nos. 4,466,984 and 4,551,884.

Illustrated in FIG. 7 are the positions of various article and apparatus components at the onset of stuffing. In this respect, one disc 22a is located forward of the tilted discs in the array 64 and positioned in an upright orientation on the stuffing tube 54 adjacent the discharge end 58. The deshirred casing 68 is extended from the shirred supply 60 over the sizing means 62 to the stuffing tube discharge end 58. At the discharge end, the casing is drawn over the rim 32 of disc 22a and is closed by any suitable means such as a clip 74. Clip 74 also closes a portion 12a of the tubular membrane extending forward from the disc 22a and joins it to the casing.

Preferably, the disc 22a is larger in diameter than the casing so an emulsion seal is established between the casing and the disc rim 32. The emulsion seal split ring 70 which is closed about the rim 32 of the disc 22a, holds the disc in position at the discharge end 58 and also assists in providing an emulsion seal between the casing and the disc. The positioning ring 72 is located adjacent the array 64 but does not contact any of the tilted discs in the array. Ring 72 performs a guiding function for longitudinal movement of the discs towards the discharge end 58 as discussed hereinbelow.

FIG. 8 shows that when a food product 71 is introduced through the stuffing tube and into the closed casing, the casing is drawn forward (to the left as viewed in the figures) and away from the stuffing tube discharge 58. However, disc 22a does not move forward because the internal pressure of the food product pressing against the front surface 23 of the disc forces the disc back against the emulsion seal split ring 70. Consequently, there is a longitudinal tensioning of the tubular membrane portion 12a forward of the disc 22a which causes it to separate and tear away from the held disc 22a across the frangible area 14a (e.g., along the line of perforations 18a shown in FIG. 1). Thus, the membrane portion 12a which is attached to the casing by clip 74 is flattened against the inside surface 73 of the casing and is carried forward along with the deshirred casing as the food product is discharged from the stuffing tube and stuffed into the casing. This forms the rounded leading end 75 of the stuffed casing.

When the desired length of stuffed casing has been attained, the introduction of the food product into the casing stops. At this point the emulsion seal split ring 70 advances in the stuffing direction (forward to the left as viewed in the figures) which forces the disc 22a off the discharge end 58 of the stuffing tube (FIG. 9). Pushing disc 22a forward pulls on the membrane portion 12b to draw the next disc 22b forward from the array 64 and towards the stuffing tube discharge end 58 (FIG. 9).

As disc 22b is pulled forward from its tilted position in the array 64, the disc and the frangible area 14b of the tubular membrane pivot to a more upright position with respect to the longitudinal axis 66. This brings the disc 22b into a position where it can be engaged by positioning ring 72. The positioning ring 72 translates in a forward direction along a path parallel to the longitudinal axis 66 and engages the upright disc 22b as shown in FIG. 9. As the positioning ring 72 continues to move forward, it guides the disc 22b to the discharge end 58 and positions the disc in an upright position at the discharge end as shown in FIG. 10.

A conventional clip and sever sequence is initiated to separate the casing between discs 22a and 22b. In this sequence, a conventional clip closure means (not shown) gathers the casing between the discs 22a, 22b towards the axis 66. It then applies two clips 77, 78 to close the casing and then severes it between the clips. In this fashion, a stuffed product 80 is produced which has one conventional rounded leading end 75 and a relatively flat trailing end 82. At the rounded end 75, a short piece of tubular membrane 12a is closed with the casing by clip 74 and is flattened against the inside surface 73 of the casing. At the flat trailing end 82 which is formed by flat disc 22a, a short piece of tubular membrane 12b extends out of the stuffed product from the disc. This piece of tubular membrane is closed and attached to the casing by clip 77.

At the rounded end, the longitudinal distance "L" from clip 74 to the fully stuffed diameter "D" of the product varies depending upon the diameter of the casing. Generally, this distance is in the range of about D/2 to D/3. At the flat end however, the corresponding longitudinal distance is in the range of about D/18 to D/22 which considerably reduces the amount of rework relative to the rounded end.

After the clipping and severing sequence, the emulsion seal ring 70 and positioning ring 72 are returned to the positions shown in FIG. 7. Stuffing starts again and the process repeats such that disc 22b forms the trailing end of the next stuffed product. The stuffing operation continues in this fashion to form products having a flattened trailing end until either the supply of discs or the supply of shirred casing is exhausted.

The embodiment of the article shown in FIG. 11 is for making sausage products having two flat ends (flat leading end and a flat trailing end). In this respect, the discs for flattening the ends of the product are arranged in pairs A, B, C etc. along the tubular membrane 112. Each pair of discs A, B, C etc. includes a leading disc 86 and a trailing disc 88. Both discs are attached to the tubular membrane by a securing means 126 as described hereinabove with respect to the FIG. 1 embodiment. However, the discs 86, 88 of each pair are positioned close to and on either side of the frangible areas 114a, b, c etc.

In operation as shown in FIG. 11, the first disc pair A is positioned at the stuffing tube discharge end 58. The leading disc 86a of the pair is positioned just forward of the discharge end 58 while the trailing disc 88a is positioned on the stuffing horn at the discharge end 58. This locates the frangible area 114a in substantially the same position as the frangible area 14a of FIG. 7 at the onset of stuffing.

When the stuffing operation starts (FIG. 12), the stuffing pressure forces the closed casing 68 and the leading disc 86a away from the trailing disc 88a. The trailing disc 88a is held against the emulsion seal split ring 70 by the stuffing pressure. This results in a tensioning of the tubular membrane 112 across the frangible area 114a causing the membrane to separate between the two discs. In this fashion, the leading disc 86a is incorporated into the leading end 90 of the stuffed casing. After the desired length is stuffed, trailing disc 88a is pushed forward and off the stuffing horn discharge end 58 by advancing the emulsion seal ring 70 (FIG. 13). This moves the second disc pair B into a position where it can be guided to the discharge end 58 by the positioning ring 72 (FIGS. 13 and 14) wherein the leading disc 86b is positioned just forward of the discharge end 58 and the trailing disc 88b is positioned on the stuffing horn at the discharge end.

The casing 68 is gathered, closed and severed behind the trailing disc 88a which incorporates the disc into the casing to form the flat trailing end 92 of the stuffed product (FIG. 14).

As described herein and as best seen in FIG. 7, the shirred casing 60 and disc array 64 are disposed on the stuffing tube 54. This requires separately mounting to the stuffing tube, first the shirred casing 60, then the sizing disc 62 and then the disc array 64. However, as disclosed in U.S. Pat. No. 4,466,984, these components can be incorporated into a casing article by mounting the shirred casing, sizing disc and disc array onto a support tube which in use, is slipped onto the stuffing tube of a stuffing machine by extending the stuffing tube through the support tube.

Thus, it should be appreciated that the present invention provides an article and method useful in flattening an end of a stuffed product. One article embodiment, as shown in FIG. 1, is useful for flattening one end of the stuffed product whereas the article embodiment as shown in FIG. 11 is useful for flattening both ends of the stuffed product. Moreover, by incorporating frangible areas into the tubular membrane as described, the need to fabricate both male and female discs which snap-fit together is eliminated and the discs can be identical. The frangible areas in the tubular membrane further reduce the inconsistency heretofore experienced in obtaining the separation of snapped together end-flattening discs.

Having described the invention in detail, what is claimed as new is:

1. An article for use in flattening an end of a stuffed casing product comprising:
   a) an elongated tubular flexible membrane having at spaced intervals along its length, a plurality of discrete transverse frangible areas dividing said elongated tubular flexible membrane into shorter sections which are separable one from another upon tensioning across said frangible areas;
   b) a plurality of flat discs of a size sufficient for insertion into a food casing and defining a means for flattening an end of a stuffed product to be made with a said food casing, each said disc having a central opening therethrough bounded by an inner wall;
   c) said membrane extending through the central opening in each disc and said discs being oriented normal to the longitudinal axis of said flexible tubular membrane and positioned at spaced locations along said tubular membrane such that at least one of said discs is associated with each of said shorter sections; and
   d) means at each of said spaced locations for securing the outer surface of said tubular membrane and a said disc to each other.

2. An article as in claim 1 wherein said frangible areas are formed by a line of perforations in said tubular membrane extending around its circumference, said line of perforations defining the ends of each shorter section and weakening said tubular membrane to permit the separation of said sections along said line of perforations upon longitudinal tensioning of said tubular membrane across said frangible areas.

3. An article as in claim 1 wherein said discs are substantially equally spaced along said flexible tubular membrane with only one disc associated with each of said shorter sections.

4. An article as in claim 3 wherein each flat disc is secured to said tubular membrane adjacent one of said frangible areas.

5. An article as in claim 1 wherein said securing means is an element disposed wholly within said tubular membrane and secures said membrane to said disc inner wall.

6. An article as in claim 5 wherein said element presses radially outwardly on the inside surface of said tubular membrane and against said disc inner wall to clamp said tubular membrane therebetween.

7. An article as in claims 5 or 6 wherein said element is a ring disposed in a snap-fit relationship with said disc inner wall.

8. An article as in claim 7 wherein a radially outwardly opening circumferential groove is formed in each ring about its outer periphery for receiving therein said disc inner wall.

9. An article as in claim 7 wherein said disc inner wall has a groove therein and said ring has an outer periphery formed as a mating portion which fits said groove for securing a portion of said tubular membrane therein.

10. An article as in claim 9 wherein said groove extends circumferentially around said disc inner wall and receives the entire outer circumferential surface of said ring.

11. An article as in claim 1 wherein each disc has a channel formed in a flat end surface thereof extending about said central opening, said tubular membrane having a portion draped in said channel, and means securing said draped portion in said channel.

12. An article as in claim 1 having a pair of said discs associated with each of said shorter sections, wherein a disc of each pair is located adjacent the frangible areas defining the ends of a said associated shorter section.

* * * * *